United States Patent
Samanta et al.

(10) Patent No.: US 9,292,204 B2
(45) Date of Patent: Mar. 22, 2016

(54) SYSTEM AND METHOD OF REBUILDING READ CACHE FOR A REBOOTED NODE OF A MULTIPLE-NODE STORAGE CLUSTER

(71) Applicant: LSI Corporation, San Jose, CA (US)

(72) Inventors: Sumanesh Samanta, Bangalore (IN); Sujan Biswas, Bangalore (IN); Horia Cristian Simionescu, Foster City, CA (US); Luca Bert, Cumming, GA (US); Mark Ish, Sandy Springs, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 13/926,740

(22) Filed: Jun. 25, 2013

(65) Prior Publication Data

US 2014/0351523 A1 Nov. 27, 2014

(30) Foreign Application Priority Data

May 24, 2013 (IN) ................ 599KOL2013

(51) Int. Cl.
*G06F 3/06* (2006.01)
*G06F 12/08* (2006.01)
*G06F 12/12* (2006.01)
*G06F 11/10* (2006.01)
*G06F 9/44* (2006.01)

(52) U.S. Cl.
CPC .............. *G06F 3/06* (2013.01); *G06F 11/1076* (2013.01); *G06F 12/0871* (2013.01); *G06F 12/121* (2013.01); *G06F 9/4401* (2013.01); *G06F 2212/1016* (2013.01); *G06F 2212/311* (2013.01); *G06F 2212/466* (2013.01)

(58) Field of Classification Search
None
See application file for complete search history.

(56) References Cited

U.S. PATENT DOCUMENTS

| 7,139,933 B2 | 11/2006 | Hsu et al. | |
| 2008/0276040 A1* | 11/2008 | Moritoki | ........................ 711/113 |
| 2011/0191522 A1 | 8/2011 | Condict et al. | |
| 2013/0054869 A1 | 2/2013 | Tolia et al. | |

* cited by examiner

*Primary Examiner* — Denise Tran

(57) ABSTRACT

A system and method for managing cache memory of at least one node of a multiple-node storage cluster. A first cache data and a first cache metadata are stored for data transfers between a respective node and regions of a storage cluster receiving at least a first selected number of data transfer requests. When the node is rebooted, a second (new) cache data is stored to replace the first (old) cache data. The second cache data is compiled utilizing the first cache metadata to identify previously cached regions of the storage cluster receiving at least a second selected number of data transfer requests after the node is rebooted. The second selected number of data transfer requests is less than the first selected number of data transfer requests to enable a rapid build of the second cache data.

20 Claims, 3 Drawing Sheets

SYSTEM AND METHOD OF REBUILDING READ CACHE FOR A REBOOTED NODE OF A MULTIPLE-NODE STORAGE CLUSTER

PRIORITY

The present application claims priority under 35 U.S.C. 119(b) to Indian Patent Application Serial No. 599/KOL/2013, entitled SYSTEM AND METHOD OF REBUILDING READ CACHE FOR A REBOOTED NODE OF A MULTIPLE-NODE STORAGE CLUSTER, By Sumanesh Samanta et al., filed May 24, 2013, which is currently co-pending, or is an application of which a currently co-pending application is entitled to the benefit of the filing date.

FIELD OF INVENTION

The disclosure relates to the field of cache management in multiple-node direct attached data storage systems.

BACKGROUND

Data storage systems, such as redundant array of independent disks (RAID) systems typically provide protection against disk failures. However, direct attached storage (DAS) RAID controllers have little to no defense against server failure because they are typically embedded within a server. Two or more nodes (i.e. servers) are often used for high availability storage clusters to mitigate consequences of a failure.

In multiple-node storage clusters, cache is frequently maintained on a local server. This local cache, often running from Gigabytes to Terabytes in size, helps in low latency and high performance completion of data transfers from regions of the storage cluster experiencing high activity or "hot" input/output (IO) data transfer requests. The local READ cache of a temporarily disabled node can become stale or invalid because other nodes continue to actively transfer data to cached and non-cached regions of the storage cluster. Thus, when the node is rebooted, old cache data is typically purged and new local cache is built for the rebooted node, which can be very time-consuming and degrading to node performance.

SUMMARY

Various embodiments of the disclosure include a system and method for managing local cache memory of at least one node of a multiple-node storage cluster to improve ramp up of cache data in the local cache memory after a respective node is rebooted. According to various embodiments, the storage cluster includes a plurality of storage devices, such as one or more JBOD complexes, accessible by a plurality of nodes in communication with the storage cluster. At least one storage device is configured to store local cache memory for at least one node of the plurality of nodes. The cache memory includes a first cache data and a first cache metadata associated with data transfers between the respective node and regions of the storage cluster receiving at least a first selected number of data transfer requests (e.g. at least 3 IO hits). The selected number of data transfer requests can be arbitrarily set to any value suitable for caching data and metadata corresponding to "hot" IO or high activity regions of the storage cluster.

When the node is temporarily disabled (e.g. failed, shutdown, suspended, or restarted), the first cache data may become stale or invalid. A cache manager in communication with the cache memory is configured to store a second (new) cache data in the cache memory when the node is rebooted to replace the first (old) cache data. The cache manager is configured to compile the second cache data by caching at least some regions of the storage cluster that were previously cached by the first cache data upon receiving at least a second selected number of data transfer requests (e.g. 1 IO hit) at the previously cached regions after the node is rebooted. The previously cached regions are determined or identified utilizing the first cache metadata, thereby allowing the first cache data to be purged (i.e. deleted or disregarded) when the node is disabled or rebooted. The second selected number of data transfer requests is less than the first selected number of data transfer requests to enable a rapid build or ramp up of the second cache data based upon the first cache metadata. Node performance and, therefore, the overall system performance are improved by decreasing the time required to rebuild at least a portion of the local cache after the respective node is rebooted.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
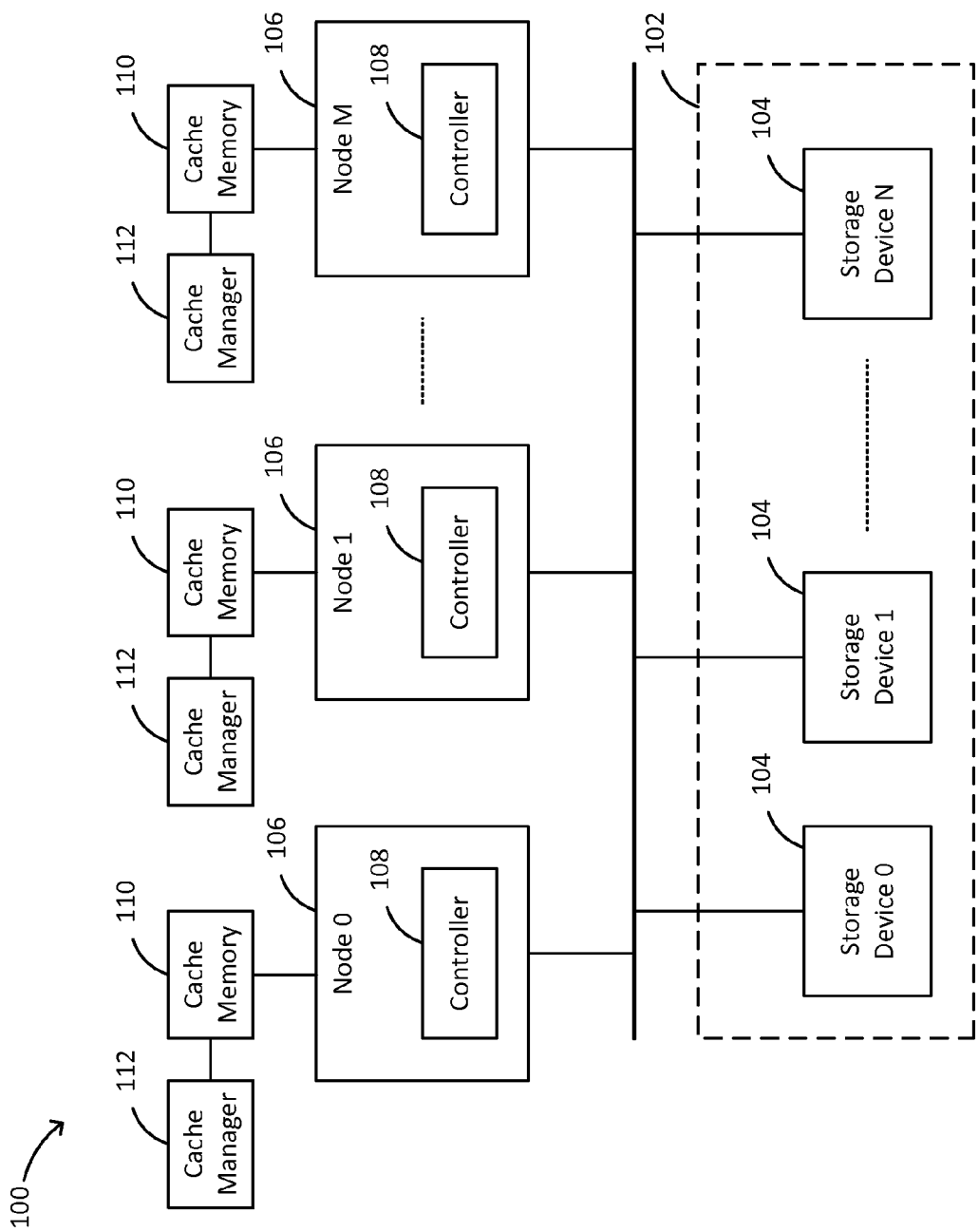
FIG. 1 is a block diagram illustrating multiple-node storage system, in accordance with an embodiment of the disclosure.

FIG. 1 illustrates an embodiment of a multiple-node storage system 100. The system 100 includes at least one storage cluster 102, such as a high availability cluster, accessible by a plurality of server nodes 106. Each node 106 includes at least one controller 108 such as, but not limited to, a RAID controller, RAID on Chip (ROC) controller, or at least one single-core or multiple-core processor. The respective controller 108 of each node 106 is configured to transfer data to or from logical block address regions or "windows" defined across a plurality of storage devices 104, such as hard disk drives (HDDs) or solid-state disk (SSD) drives, making up the storage cluster 102.

In some embodiments, two or more groupings of the storage devices 104 are contained in two or more enclosures. In some embodiments, the enclosures are separately powered to allow a first server to take over a grouping of shared storage devices 104 and continue to process data transfer requests without disruption when a second server is permanently or temporarily disabled. In some embodiments, host nodes 106 include at least one processor running a computing program, such as WINDOWS SERVER or VMWARE CLUSTER SERVER, configured to provide planned or unplanned failover service to applications or Guest OS.

According to various embodiments, each node 106 includes or is communicatively coupled to at least one respective storage device 110 configured to store local cache memory. In some embodiments, the local storage device 110 includes a SSD drive. The cache memory 110 is configured to aid data transfers between the respective node 106 and cached regions of the storage cluster 102 for low latency data transfers and increased IO operations per second (IOPs). In some embodiments, the local storage device 110 is onboard the controller 108 or coupled directly to the respective node 106, thus sharing the same power domain.

A local cache manager 112 in communication with the cache memory 110 is configured to manage cache data and cache metadata stored in the cache memory 110. In some embodiments, the cache manager 112 includes at least one dedicated processor or controller configured to manage the cache memory 110 for at least one respective node 106 according to program instructions executed by the processor from at least one carrier medium. In some embodiments, the cache manager 112 includes a module running on the controller 108 or a processor of the respective node 106.

In some embodiments, the system 100 includes a High Availability DAS cluster with very large (e.g. one or more terabytes) cache memory 110 for each node 106. Large cache memory 110 can provide a significant boost in application performance; however, a considerable amount of time is needed to ramp up or compile cache data. In some instances, a particular node 106 is temporarily disabled (may be only for a few minutes) due to failure, shutdown, suspension, restart, routine maintenance, power cycle, software installation, or any other user-initiated or system-initiated event resulting in an period of nodal inactivity. Several means exist in the art for retaining READ cache data and cache metadata of a respective node 106 when the node 106 is either intentionally or unintentionally disabled.

In some embodiments, for example, the cache manager 112 is configured to store all cache data and cache metadata in the cache memory 110 prior to intentionally disabling (e.g. shutting down, restarting, or suspending) the respective node 106 by flushing random access memory (RAM) to the cache memory 110. In some embodiments, when the node 106 is unintentionally disabled (e.g. power failure), a supercapacitor or battery backup enables a copy of the RAM image to be stored in the cache memory 110 when the node 106 is disabled. When the node 106 is rebooted, the cache metadata is read back from the cache memory 110 to the RAM. In other embodiments, the cache manager 112 is configured for periodic saving of consistent READ Cache Metadata or any alternative READ cache retention schemes known to the art.

Simple retention of READ cache data does not cure the consequences arising from a temporarily disabled node 106 for the multiple-node storage system 100. The READ cache data cannot be trusted after a node 106 is rebooted (i.e. restarted or returned to an active state) because the other nodes 106 continue to transfer data to or from the storage cluster 102 while the node 106 is disabled or rebooting. Accordingly, at least a portion of the READ cache data in the local cache memory 110 may be stale or invalid when the node 106 resumes activity. In some embodiments, at least a portion of the READ cache data for a first node 106 becomes invalid when one or more of the other nodes 106 transfer (WRITE) data to regions of the storage cluster 102 cached for the first node 106. Accordingly, the READ cache data is typically purged from the cache memory 110 when a respective node 106 is rebooted. Rebuilding a fresh cache each time a node 106 is rebooted can be very time consuming, thus resulting in significantly reduced performance each time a node is rebooted.

Figure 2:
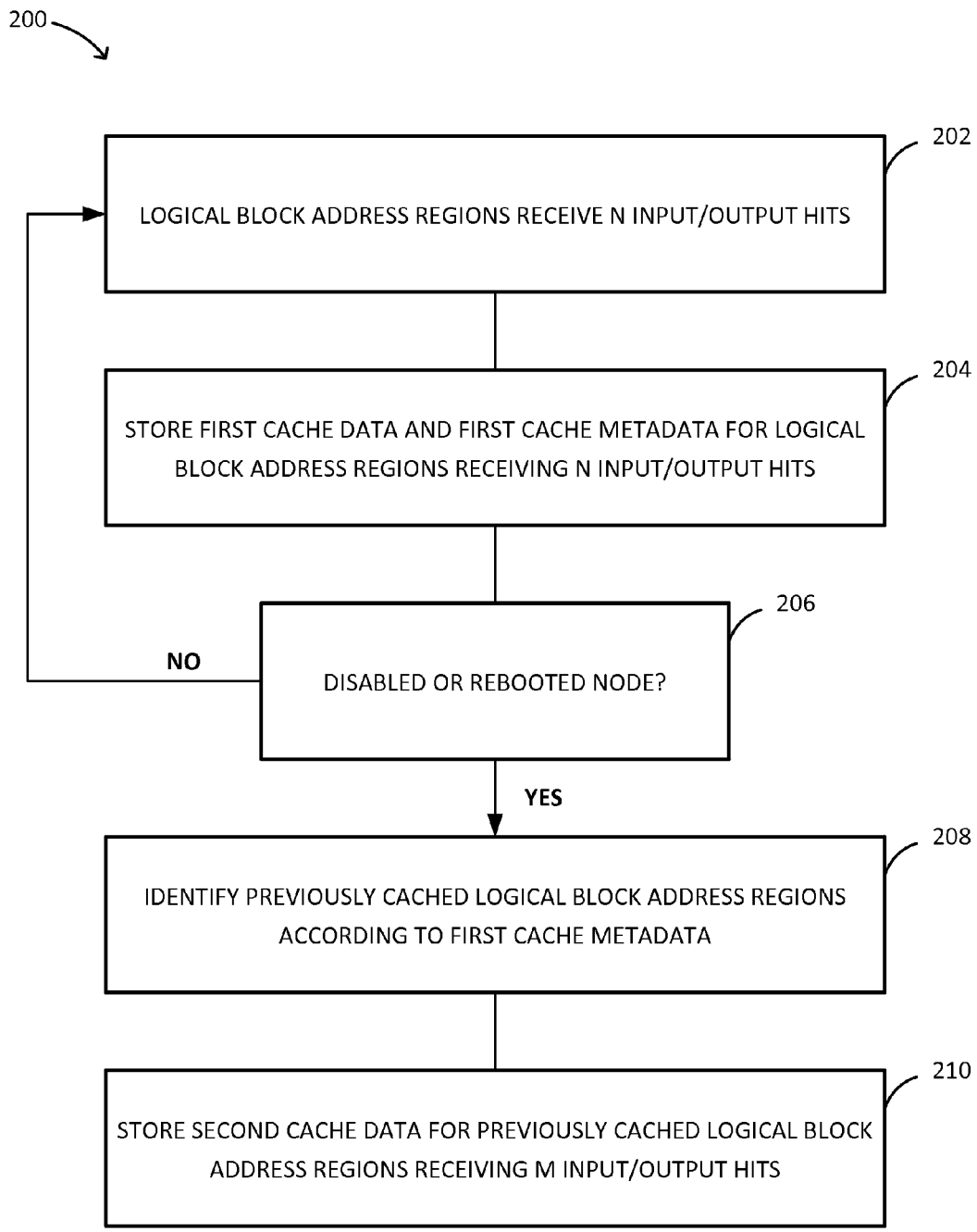
FIG. 2 is a flow diagram illustrating a method of managing cache for a rebooted node of a multiple-node storage system, in accordance with an embodiment of the disclosure.
Figure 3:
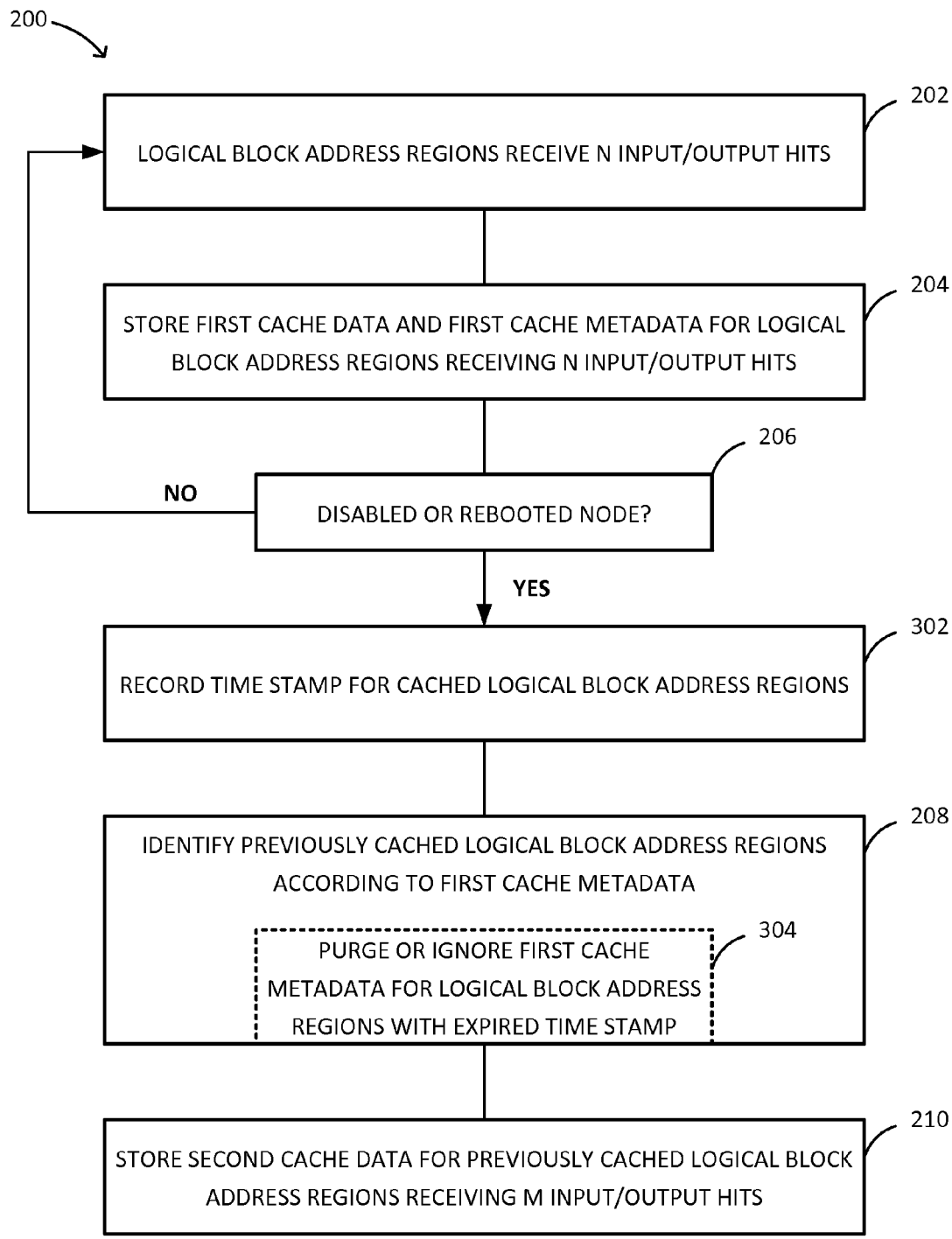
FIG. 3 is a flow diagram illustrating a method of managing cache for a rebooted node of a multiple-node storage system, in accordance with an embodiment of the disclosure.

FIGS. 2 and 3 illustrate a method 200 of building a fresh cache based upon retained cache metadata after a respective node 106 is rebooted, according to various embodiments of this disclosure. In some embodiments, method 200 is manifested by system 100. However, one or more steps may be effected by additional or alternative configurations beyond those described with regard to embodiments of system 100. Method 200 is intended to encompass any system or device configured to execute the following steps.

At step 202, high activity or "hot" logical block address (LBA) regions of the storage cluster 102 are cached for each node 106. The hot regions are those regions receiving at least a selected number "N" data transfer requests. In some embodiments, for example, a region may be considered hot after receiving N=3 IO hits. At step 204, cache data and cache metadata are stored in the cache memory 110 of each node 106 for the hot regions of the storage cluster 102. In some embodiments, the cache manager 112 is configured to store first cache data associated with data transfers between a respective node 106 (hereinafter "first node") and the hot regions of the storage cluster 102. The cache manager 112 is further configured to store first cache metadata associated with the cached regions of the storage cluster 102. According to step 206, the hot regions of the storage cluster 102 continue to be cached (steps 202 and 204) by the first cache data until the first node 106 is temporarily disabled or rebooted.

At step 208, the first cache metadata is retained in the cache memory 110 when the first node 106 is rebooted or brought back into an active state. In some embodiments the first cache metadata is retained in the same hash as cache data but flagged or identified as "stale" so that invalid cache data is not used to serve IO. Accordingly, the cache manger 112 is enabled to identify previously cached regions of the storage cluster 102 utilizing the first cache metadata. The first cache data cannot be trusted and may be purged for the cache memory 110 to make space for new or fresh cache data when the first node is rebooted.

At step 210, a second (new) cache is built utilizing the first cache metadata to identify previously cached regions of the storage cluster 102 which are still likely to be hot regions. In some embodiments, every IO data transfer goes through the hash as usual and regions associated with the first cache metadata (i.e. 'stale' entries) are cached as hot regions as soon as they are hit or after a selected number "M" hits, where M is less than N. Accordingly, the second cache data is built faster because the cache manager 112 is configured to store the second cache data for regions receiving less than N hits as long as they were previously cached (i.e. hot) regions before the first node 106 became disabled or was rebooted. Thus cache for a rebooted node 106 is ramped faster for previously cached regions of the storage cluster 102 by utilizing the first (old) cache metadata for guidance.

Since stale metadata entries are preserved in the hash table, they will utilize some of the cache memory 110. Furthermore, a stale regions may be hit a long time (e.g. 48 hours later) after the first node 106 reboots. In such a case, the first cache metadata entry cannot always be trusted. For example, the IO pattern might have completely changed while the first node was disabled. In some embodiments, illustrated in FIG. 3, the method 200 further includes step 302 of recording a time stamp for previously cached regions of the storage cluster 102 when the first node reboots. Step 208 may further include sub-step 304 of purging or ignoring first cache metadata entries associated with time stamps outside of a selected time interval. Accordingly, the method 200 of accelerating cache build for previously cached regions will only be effected for regions associated with first cache metadata that receive data transfer requests within the selected time interval. Ignoring or purging regions with expired time stamps ("stale regions") will avoid caching regions of the storage cluster 102 that are no longer hot after the first node reboots or wasting space in the cache memory 110 by storing low activity "cold" cache data or metadata.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for managing cache memory, comprising:
a cache memory for at least one node of a plurality of nodes, the cache memory including a first cache data associated with data transferred between the at least one node and regions of a storage cluster receiving at least a first selected number of data transfer requests, the cache memory further including a first cache metadata associated with identifying the regions of the storage cluster receiving at least the first selected number of data transfer requests; and
a cache manager in communication with the cache memory to re-establish one or more regions in the cache memory after the at least one node has been temporarily disabled and to store a second cache data in the cache memory when the at least one node is rebooted, the second cache data being associated with data transferred between the at least one node and one or more of the regions of the storage cluster receiving at least a second selected number of data transfer requests after the at least one node is rebooted, wherein the second selected number of data transfer requests is less than the first selected number of data transfer requests, and wherein the second selected number of data transfer requests initiates storing the second cache data.

2. The system of claim 1, wherein the second cache data is based at least partially upon the first cache metadata, and wherein the regions having received a first selected number of data transfer requests are eligible to receive the second selected number of data transfer requests.

3. The system of claim 2, wherein the cache manager is further configured to identify regions of the storage cluster according to the first cache metadata, wherein the second cache data is associated with one or more of the identified regions of the storage cluster receiving at least the second selected number of data transfer requests after the at least one node is rebooted.

4. The system of claim 1, wherein the first cache metadata has one or more stale entries, and wherein the cache manager is further configured to purge the first cache data from the cache memory to free space to store the second cache data when the at least one node is rebooted.

5. The system of claim 1, wherein the first cache metadata receives one or more time stamps when the at least one node is rebooted.

6. The system of claim 5, wherein the cache manager is further configured to use the one or more time stamps to purge or ignore a portion of the first cache metadata associated with one or more of the identified regions of the storage cluster receiving the second selected number of data transfer requests outside of a selected time interval.

7. The system of claim 5, wherein the cache manager is further configured to use the one or more time stamps to identify regions of the storage cluster according to at least a portion of the first cache metadata receiving the second selected number of data transfer requests within a selected time interval.

8. A storage system, comprising:
a storage cluster including a plurality of storage devices;
a plurality of nodes in communication with the storage cluster;
a cache memory for at least one node of the plurality of nodes, the cache memory including a first cache data associated with data transferred between the at least one node and regions of the storage cluster receiving at least a first selected number of data transfer requests, the cache memory further including a first cache metadata associated with identifying the regions of the storage cluster receiving at least the first selected number of data transfer requests; and
a cache manager in communication with the cache memory to re-establish one or more regions in the cache memory after the at least one node has been temporarily disabled and to store a second cache data in the cache memory when the at least one node is rebooted, the second cache data being associated with data transferred between the at least one node and one or more of the regions of the storage cluster receiving at least a second selected number of data transfer requests after the at least one node is rebooted, wherein the second selected number of data transfer requests is less than the first selected number of data transfer requests, and wherein the second selected number of data transfer requests initiates storing the second cache data.

9. The system of claim 8, wherein the second cache data is based at least partially upon the first cache metadata, and wherein regions of the storage cluster receiving at least the first selected number of data transfer requests are hot regions of the storage cluster.

10. The system of claim 9, wherein the cache manager is further configured to identify regions of the storage cluster according to the first cache metadata, wherein the second cache data is associated with one or more of the identified regions of the storage cluster receiving at least the second selected number of data transfer requests after the at least one node is rebooted.

11. The system of claim 8, wherein the first cache metadata has one or more flagged entries to flag cache data invalidated during the temporary disablement of the at least one node, and wherein the cache manager is further configured to purge the first cache data from the cache memory to free space to store the second cache data when the at least one node is rebooted.

12. The system of claim 8, wherein the first cache metadata includes one or more time stamps for determining a selected time interval.

13. The system of claim 12, wherein the cache manager is further configured to purge at least a portion of the first cache metadata associated with one or more of the identified regions of the storage cluster receiving the second selected number of data transfer requests outside of the selected time interval.

14. The system of claim 12, wherein the cache manager is further configured to identify regions of the storage cluster according to at least a portion of the first cache metadata receiving the second selected number of data transfer requests within the selected time interval.

15. A method of managing cache memory, comprising:
storing a first cache data in a cache memory, the first cache data associated with data transferred between at least one node of a plurality of nodes and regions of a storage cluster receiving at least a first selected number of data transfer requests;
storing a first cache metadata associated with identifying the regions of the storage cluster receiving at least the first selected number of data transfer requests;
re-establishing one or more regions of the cache memory after the at least one node has been temporarily disabled; and
storing a second cache data when the at least one node is rebooted, the second cache data being associated with data transferred between the at least one node and one or more of the regions of the storage cluster receiving at least a second selected number of data transfer requests after the at least one node is rebooted, wherein the second selected number of data transfer requests is less than the first selected number of data transfer requests, and wherein receiving the second selected number of data transfer requests initiates storing the second cache data.

16. The method of claim 15, further comprising:
identifying regions of the storage cluster according to the first cache metadata, wherein the second cache data is associated with one or more of the identified regions of the storage cluster receiving at least the second selected number of data transfer requests after the at least one node is rebooted.

17. The method of claim 15, further comprising:
flagging one or more entries of the first cache metadata as stale; and
purging the first cache data when the at least one node is rebooted.

18. The method of claim 15, further comprising:
recording time stamps in the first cache metadata to determine a selected time interval.

19. The method of claim 18, further comprising:
purging at least a portion of the first cache metadata associated with one or more of the identified regions of the storage cluster receiving the second selected number of data transfer requests outside of the selected time interval.

20. The method of claim 18, wherein re-establishing the one or more regions of the cache memory after the at least one node has been temporarily disabled includes:
identifying regions of the storage cluster according to at least a portion of the first cache metadata that received the second selected number of data transfer requests within the selected time interval.

* * * * *